United States Patent [19]
McMillan

[11] Patent Number: 4,923,663
[45] Date of Patent: May 8, 1990

[54] METHOD OF LINING TUBULAR MEMBERS INCLUDING ROLLING AND CRUSHING A LINER

[75] Inventor: Jim S. McMillan, Fort Worth, Tex.

[73] Assignee: Simon Sama'an Tarsha, Fort Worth, Tex.

[21] Appl. No.: 258,796

[22] Filed: Oct. 17, 1988

[51] Int. Cl.⁵ ............... B29C 43/46; B29C 63/34; B29C 63/38
[52] U.S. Cl. ............... 264/229; 264/269; 264/280; 264/516; 425/329; 425/345; 425/366
[58] Field of Search ............... 264/209.4, 267, 269, 264/270, 280, 36, 229, 230, 516; 29/235, 244, 451, 508, 515; 72/206, 224, 416; 100/144, 158 R, 161, 177, 226; 156/294; 425/329, 345, 366

[56] References Cited

U.S. PATENT DOCUMENTS

| | | | |
|---|---|---|---|
| 323,062 | 7/1885 | Murphy | 100/158 R |
| 1,708,141 | 4/1929 | Kepler. | |
| 3,462,825 | 8/1969 | Pope et al. | |
| 3,494,813 | 2/1970 | Lawrence et al. | |
| 3,684,622 | 8/1972 | Goldsworthy | 156/441 |
| 3,959,424 | 5/1976 | Dawson et al. | 264/516 |
| 4,325,772 | 4/1982 | Suetoshi et al. | |
| 4,427,480 | 1/1984 | Kamuro et al. | |

FOREIGN PATENT DOCUMENTS

| | | | |
|---|---|---|---|
| 0575424 | 5/1959 | Canada | 29/451 |
| 0226410 | 6/1987 | European Pat. Off. | 156/293 |
| 2705645 | 8/1978 | Fed. Rep. of Germany | 72/224 |
| 0273934 | 12/1986 | Japan | 264/267 |
| 2004984 | 1/1987 | Japan | 405/154 |
| 0617275 | 7/1978 | U.S.S.R. | 264/230 |
| 0794907 | 5/1958 | United Kingdom | 156/294 |
| 0807413 | 1/1959 | United Kingdom | 264/269 |
| 2084686 | 4/1982 | United Kingdom. | |

OTHER PUBLICATIONS

Gas World, Feb. 1987.
Pipeline & Utilities Construction, Jul. 1987.

Primary Examiner—Michael W. Ball
Assistant Examiner—Steven D. Maki
Attorney, Agent, or Firm—Charles D. Gunter, Jr.

[57] ABSTRACT

A method and apparatus are shown for lining a tubular member with an elastomeric liner having an outside diameter which is initially greater than the inside diameter of the tubular member. A length of the liner is reduced to a downsized outside diameter by rolling and simultaneously crushing the liner a preselected amount, whereby the liner retains a standard dimensional ratio in the downsized condition. The liner is inserted into the tubular member to be lined and is allowed to expand to substantially its original outside diameter to thereby bond the liner within the tubular member.

7 Claims, 3 Drawing Sheets

METHOD OF LINING TUBULAR MEMBERS INCLUDING ROLLING AND CRUSHING A LINER

BACKGROUND OF THE INVENTION

1. Field of the Invention.

The present invention relates generally to a method and apparatus for lining a tubular member, such as a steel pipe, with a synthetic liner, the liner being securely bonded within the pipe interior without the application of heat, vacuum or chemical bonding agents.

2. Description of the Prior Art.

Fluid-carrying pipes are often subject to corrosion and other conditions which are detrimental to the life of the pipe, or to the fluids moving through the pipe. Plastic inserts have been used in the past for protective purposes but generally involve cumbersome and difficult procedures for effectively installing such liners, and particularly in sealing them to the wall of pipe.

U.S. Pat. No. 3,494,813, to Lawrence et al, Feb. 10, 1970, shows a method for installing a plastic liner in a pipe by using vacuum to draw the liner into the pipe and to assure tight sealing engagement between the liner and the pipe wall.

U.S. Pat. No. 1,708,141, to Kepler, Apr. 9, 1929, shows a method of lining a pipe with an elastomeric lining in which the lining is pushed through a reducing die and coated with cement.

U.S. Pat. No. 3,462,825, to Pope et al, Aug. 26, 1969, shows a method for lining a tubular member with a fluorocarbon liner having an initial outside diameter greater than the inside diameter of the tubular member. The liner is placed in the tubular member by gripping one end of the liner and pulling it through a reducing die and into the tubular member. The liner is then released, allowing it to expand into engagement with the inner wall of the tubular member. Although certain of the above methods have attempted to install synthetic liners within tubular conduit without the use of heat, adhesives or vacuum, these methods have generally failed to effect a linear elongation of the synthetic liner so that the liner maintains a standard dimensional ratio and returns to a predetermined size to fill out and conform to the internal diameter of the surrounding pipe.

An object of the present invention is to provide an improved synthetic liner for a tubular member in which the liner is firmly held in position within the tubular member by reason of radial pressure exerted on the tubular member by the synthetic liner.

Another object of the invention is to provide a method for installing a liner within a tubular member which places the liner in a condition of circumferential compression to provide a firm bond with the surrounding tubular member.

Another object of the invention is the provision of a liner for a tubular member which is installed without the necessity of heating the liner with the risk of imparting thermal stresses to the liner.

Another object of the invention is to provide a method for lining a tubular member without the use of chemical bonding agents which, on occasion, fail to provide uniform bonding of the liner to the surrounding tubular member.

SUMMARY OF THE INVENTION

The method of the invention is used to line a tubular member with an elastomeric liner having an outside diameter which is initially greater than the inside diameter of the tubular member. A length of the liner is first reduced to a downsized outside diameter by rolling and simultaneously crushing the liner, whereby the liner retains a standard dimensional ratio in the downsized condition. The downsized liner is then inserted into the tubular member to be lined and allowed to expand to substantially its original outside diameter to, make 360 degree contact with the tubular member; thereby bonding the liner within the tubular member.

Preferably, the liner is downsized by feeding the liner through a series of specially arranged downsizing rollers to a hydraulic press, the press having first and second hydraulic crushing stations. The crushing stations are actuated to grip and compress the liner in staggered fashion, the liner being rolled by the downsizing rollers and simultaneously crushed by passing through the hydraulic press. The crushing stations can comprise travelling carriages, each travelling carriage being provided with a crushing die for alternately crushing and releasing the liner. The carriages are preferably track-mounted on a base for movement in a generally horizontal plane.

Additional objects, features, and advantages will be apparent in the written description which follows.

BRIEF DESCRIPTION OF THE DRAWINGS

in FIG. 1;

in FIG. 3;

DETAILED DESCRIPTION OF THE INVENTION

Figure 1:
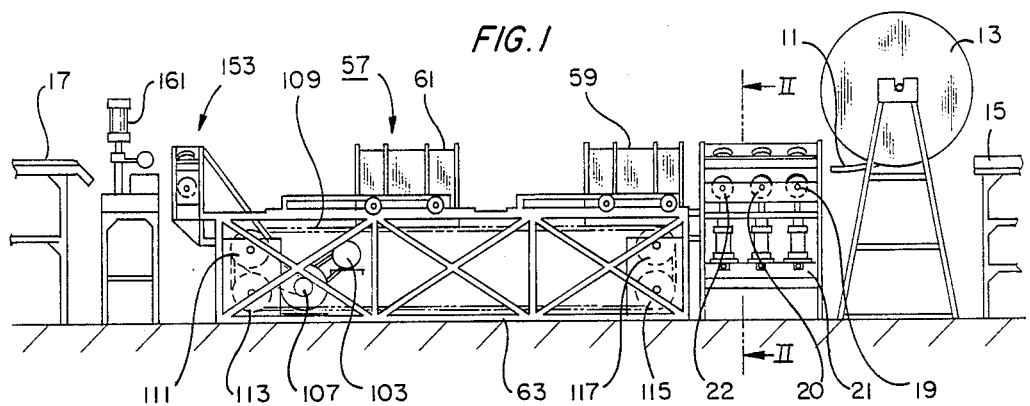
FIG. 1 is a simplified schematic view illustrating the steps in the method of the invention.

FIG. 1 is a simplified schematic view of the steps and apparatus used in the method of the invention. A length of elastomeric liner 11 is fed from a supply roll 13 or table 15 through the apparatus to a tubular member 17 to be lined. The tubular member 17 can be, for instance, a cylindrical conduit, such as a steel pipe. The elastomeric liner 11 can be any synthetic elastomer which initially has an outside diameter greater than the inside diameter of the tubular member 17 and which can be downsized and returned to substantially its original outside diameter according to the method of the invention. Preferred liner materials include polyolefin materials, with the preferred material being commercially available polyethylene pipe. It is preferred that the polyethylene pipe be of about 10 to 15% greater initial outside diameter than the tubular member to be lined. An increase in initial outside diameter of the liner increases the force necessary to downsize the liner. As a result, a liner having only slightly greater outside diameter than the tubular member 17 to be lined is preferred.

The wall thickness of the liner is not critical, so long as it is great enough to permit the liner to be downsized without distortion of the liner material.

Figure 2:
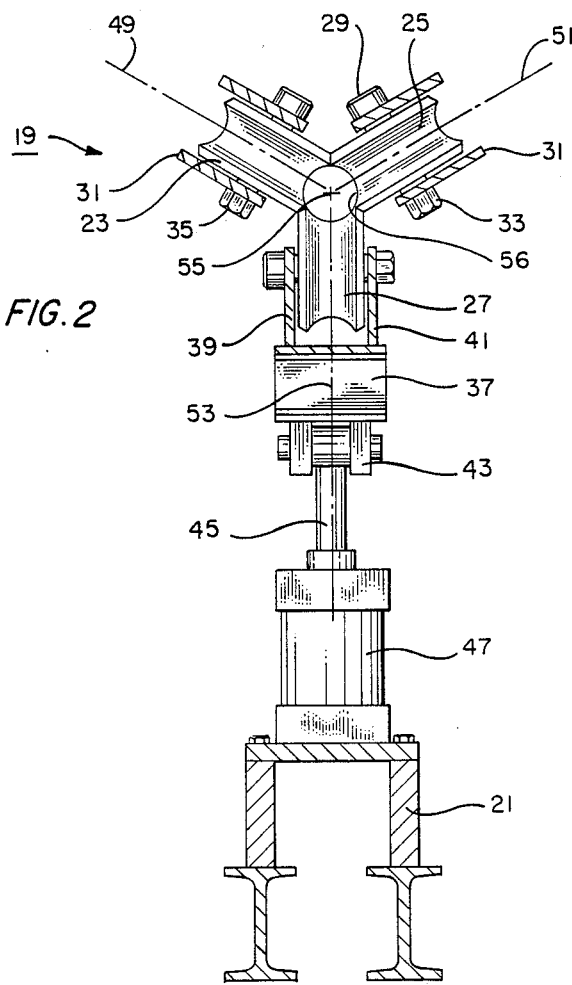
FIG. 2 is an isolated view of one set of downsizing rollers taken along lines II.—II.

Turning again to FIG. 1, the liner 11 is first passed through three sets of downsizing rollers 19, 20, 22 at a rolling station 21. FIG. 2 shows one set of downsizing rollers 19 in isolated fashion for ease of illustration. Each set of downsizing rollers 19 includes three hemispherical rollers 23, 25, 27, each of which is rotatable about a shaft 29 mounted on the frame 31 of the rolling station 21. Rollers 23 and 25 are adjustably mounted on the frame portions 31, 33 of the rolling station 21 by means of nuts 33, 35. Roller 27 is mounted on a base 37 having vertically extending flanges 39, 41 and is connected by means of a yoke 43 to the output shaft 45 of a hydraulic piston 47. Hydraulic piston 47 can be selectively actuated to move the bottom roller 27 between a closed position, as shown in FIG. 2, and an open position in which the roller 27 moves vertically downward.

Each of the rollers 23, 25, 27 has a central axis of rotation 49, 51, 53 which forms a 120 degree angle with the next adjacent roller and which intersects at the midpoint 55 of a liner receiving opening 56 when the bottom roller 27 is in the closed position. In the closed position shown in FIG. 2, the three rollers 23, 25, 27 comprise a "Y"-shaped configuration which defines a 360° region of contact with the liner being fed through the liner receiving opening 56.

Since a smaller diameter roller produces a greater shock on the liner being downsized, each of rollers 21, 23, 25 has a diameter (taken along the central axis of rotation 49) at least about one and one half times the outside diameter of the liner 11. Preferably, the roller diameter is at least twice the original outside diameter of the liner 11.

As shown in FIG. 1, there are three roller sets 19, 20, 22 mounted in the rolling station 21 along the longitudinal axis defined by the midpoint 55 of the liner receiving opening 56. Each of the roller sets 20, 22 is identical in construction and arrangement to that of the first roller set 19 shown in FIG. 2. However, each of the roller sets 20, 22 is machined to provide a progressively smaller liner receiving opening. For instance, in the embodiment shown in FIG. 1, the first roller set 19 provides a 2% reduction in the original outside diameter of the liner 11 with liner set 20 providing a 4% reduction and liner set 22 providing a 6% reduction in the original outside diameter of the liner 11.

Figure 3:
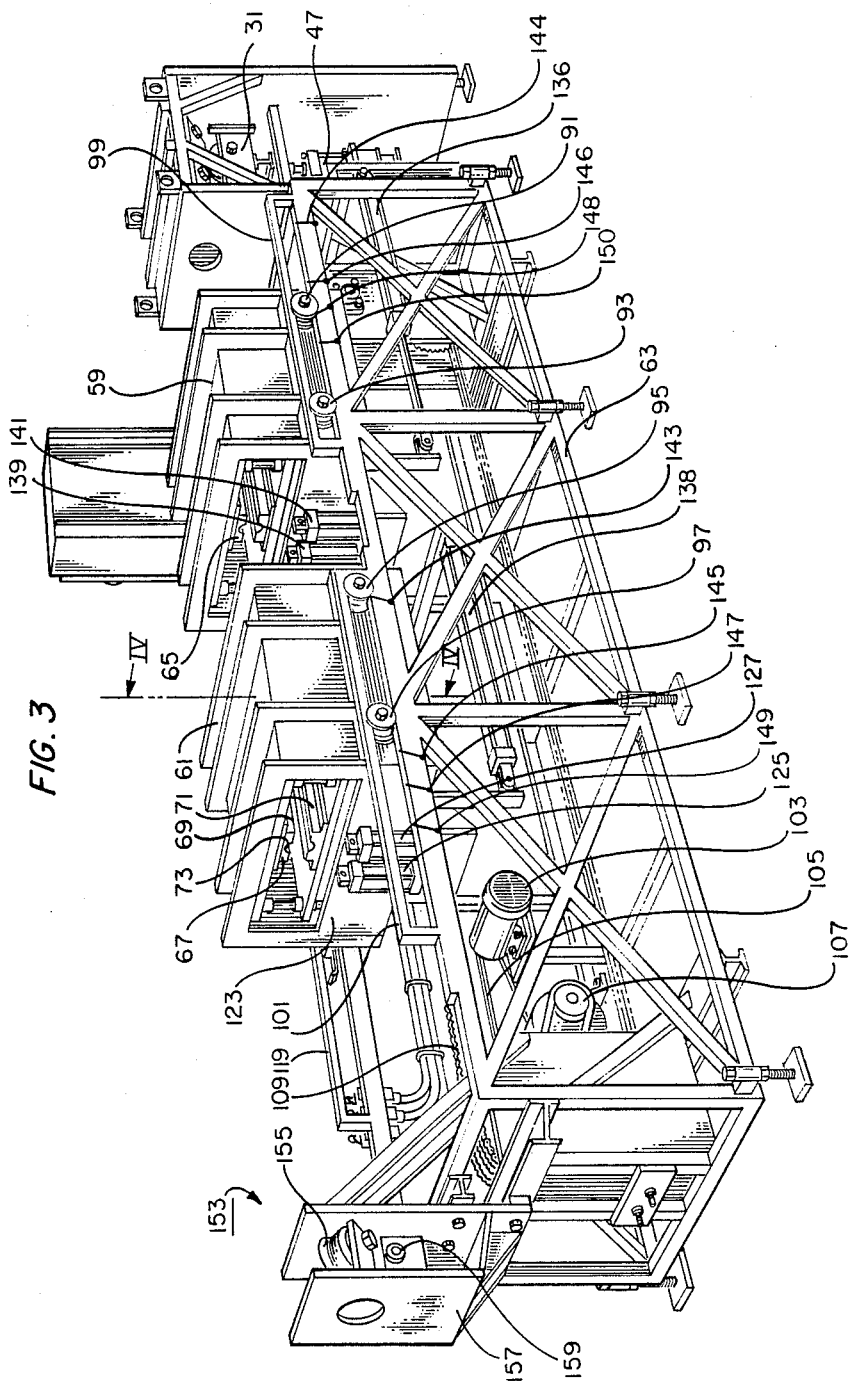
FIG. 3 is a side, perspective view of the rolling and crushing apparatus used in the method of the invention.
Figure 4:
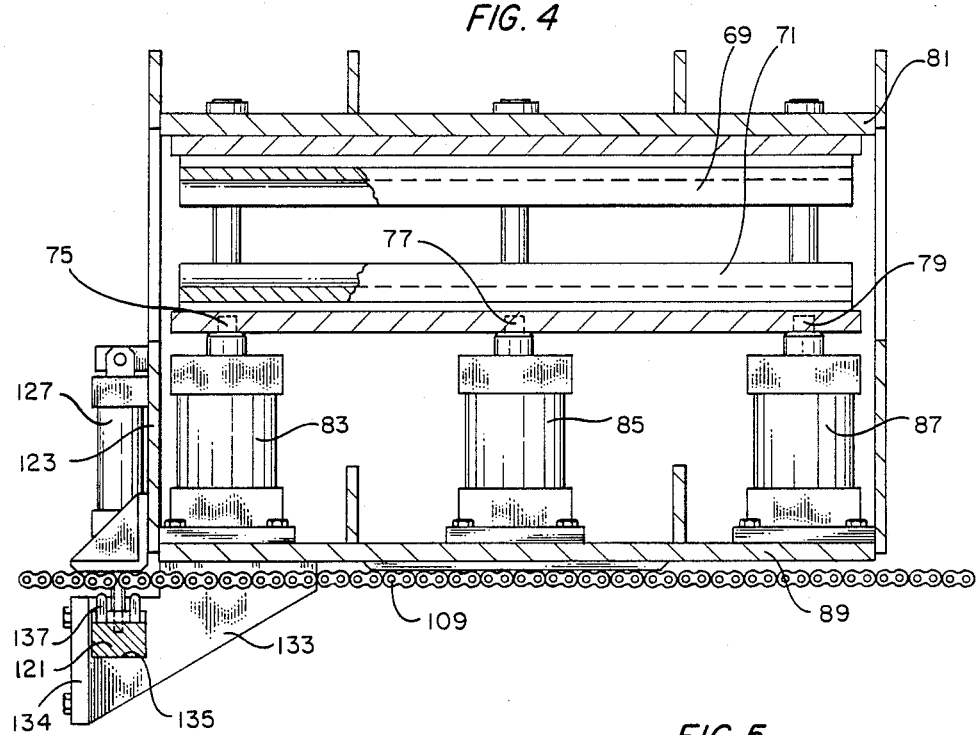
FIG. 4 is a partial, cross-sectional view taken along lines IV.—IV.

The liner 11 next passes to a crushing station 57 made up by a hydraulic press. The hydraulic press includes first and second hydraulic crushing stations 59, 61 which are mounted on a base 63. As shown in FIGS. 3 and 4, each crushing station 59, 61 comprises a travelling carriage which is provided with a hydraulically actuated crushing die 65, 67 for alternately crushing the liner 11. Each crushing die 65 includes upper and lower longitudinally extending plates 69, 71 (shown in the open position in FIG. 3) which include a semispherical profile 73 for grasping and compressing the liner 11. In the closed position, the plate openings form a liner receiving opening which is aligned with the longitudinal axis defined by the mid-point 55 of the roller openings 56.

As shown in FIG. 4, upper plate 69 is fixedly mounted to the top wall 81 of the travelling carriage 61. The bottom plate 71 is mounted for vertical movement on the output shafts 75, 77, 79 of hydraulic cylinders 83, 85, 87. The hydraulic cylinders are mounted to the bottom wall 89 of the travelling station 61 for simultaneously urging the lower plate 71 in the direction of the upper plate 69.

As shown in FIG. 3, each travelling carriage 59, 61 has travelling wheels 91, 93, 95, 97 mounted on the opposing side walls thereof for movement within spaced horizontal tracks (99, 101 shown in FIG. 3). The base 63 has a motor 103 having an output shaft which drives a belt 105. The belt 105 engages a gearbox 107 which is used to power a drive chain 109. As shown in FIG. 1, the drive chain 109 travels over idler sprockets 111, 113, 115, 117 provided on the base so that the drive chain 109 moves in a path approximately midway between the horizontal tracks 101, 119 beneath the travelling carriages 59, 61.

Figure 5:
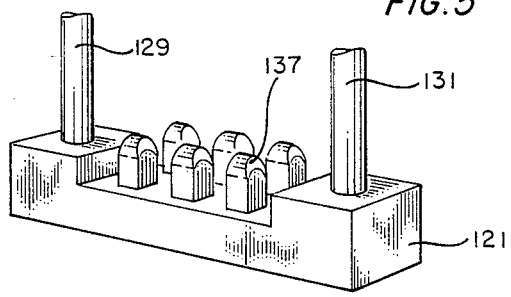
FIG. 5 is an isolated view of the engagement dog used to move the travelling carriages in the method of the invention.

As shown in FIGS. 4 and 5, each travelling carriage 59, 61 has an engagement dog 121 mounted on the front side wall 123 thereof. A pair of hydraulic cylinders 125, 127 are fixedly mounted on the front side wall 123 and have output shafts 129, 131 (FIG. 5) which are joined to the engagement dog 121. A load flange 133 (FIG. 4) extends from the carriage bottom wall 89 and includes a vertical wall portion 134 which defines a recess 135 into which the engagement dog 121 is received. The drive chain 109 passes beneath the carriage bottom wall 89 in a horizontal plane and passes between the teeth 137 of the engagement dog 121 and the carriage bottom wall 89. When hydraulic cylinders 125, 127 are actuated, output shafts 129, 131 are retracted causing the engagement dog 121 to move vertically upward within the recess 135. The teeth 137 then engage the drive chain 109 which is being driven by the gearbox 107 toward the left as viewed in FIG. 4. The engagement dog 121 rides against the vertical portion 134 of the load flange 133 to relieve the drive force from the output shafts 129, 131 of the hydraulic cylinders 125, 127. Carriage 59 is similarly equipped with hydraulic cylinders 139, 141.

Each of the travelling carriages 59, 61 is also provided with a retracting mechanism for returning the carriage to the right as viewed in FIG. 3 to its home position. The retracting mechanism can, for instance, comprise hydraulic cylinders 136, 138 which are arranged in a horizontal plane beneath the carriages 59, 61. Each cylinder is mounted on the base 63 and has an output shaft connected to the respective carriage 59, 61.

The engagement dog cylinders 125, 127 and 139, 141 are selectively actuated to alternately engage and disengage the drive chain 109. As a result, the carriages 59, 61 are alternately moved along the horizontal tracks 99, 101 from a right hand home position to the left, as viewed in FIG. 3. The crushing cylinders (83, 85, 87 in FIG. 4) are also alternately operated, whereby the liner 11 is alternately crushed and then released by the hydraulic press. Return movement of the carriages is accomplished by the actuation of the retracting cylinders 136, 138. Thus, as carriage 59 grips the liner 11 and moves to the left, carriage 61 releases the liner and moves back to the right. Carriage 61 then grips the liner 11 and moves to the left while carriage 59 releases the liner and moves back to the right. The resulting hand-over-hand gripping operation continuously pulls the liner 11 through the crushing station 57. It should be noted, however, that in addition to securely grasping the liner 11, the crushing dies 65, 67 also crush and further downsize the outside diameter of the liner. In the embodiment shown in FIG. 3, die 65 reduces the original outside diameter of the liner 11 by approximately 10% while die 67 reduces the diameter approximately 12%.

The movement and crushing action of the carriages 59, 61 can be synchronized in a number of ways which will be familiar to those skilled in the art. For instance, each carriage 59, 61 can have an associated set of limit switches 143–150 which are engaged by the drive wheels 91, 93, 95, 97 as the wheels move within the respective tracks 99, 101. In the embodiment shown, switch 144 indicates the home position of carriage 59. (Carriage 59 is shown moved out of the home position in FIG. 3 for ease of illustration.) Both carriages 59 and 61 are shown in the home position in FIG. 1. To start the cycle, carriage 59 grips the liner 11 and leaves the home position traveling to the left. As limit switch 146 is tripped, the second carriage 61 is signaled to begin its cycle by engaging the liner 11 and moving to the left from the home position. As gripping carriage 59 engages the limit switch 148, it is signalled to disengage from the liner 11 and return to the home position where it contacts limit switch 144. Limit switch 150 is a safety shutoff to indicate over travel of the carriage. Limit switches 143, 145, 147 and 149 operate similarly with respect to the second carriage 61. A pulling station is commercially available from PM Machine Works, Inc., 2824 S.E. Loop 820, Fort Worth, Texas 76140. The commercially available pulling station was modified for the purposes of the present invention by the addition of the crushing dies 65, 67, actuable by the crushing cylinders 83, 85, 87, so that station 57 both pulls and crushes the liner 11.

After leaving the second carriage 61, the liner 11 passes through a final downsizing roller set 153. Roller set 153 is similar to downsizing roller set 19 and has three downsizing rollers (155 shown in FIG. 3) mounted within a frame 157. The downsizing rollers are arranged in a "Y"-shaped configuration identical to that shown in FIG. 2. In this case, however, the vertically oriented bottom roller is adjustably positioned by means of bolt 159 but is not hydraulically actuated as was roller 27. The final roller set 153 provides a 13–15% decrease in the original outside diameter of the liner 11 in the preferred embodiment.

After leaving the final roller set 153, the liner 11 is fed to a guillotine 161 (FIG. 1) where is is cut to an appropriate length. The liner 11 is then fed to the tubular member 17 to be lined.

Figure 6:
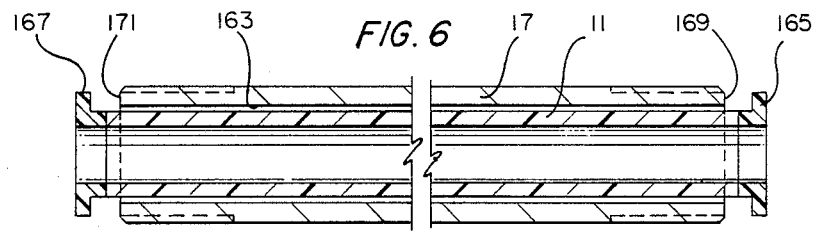
FIG. 6 is a side, cross-sectional view of the tubular member having an elastomeric liner inserted therein and prior to the liner returning to its original outside dimensions.
Figure 7:
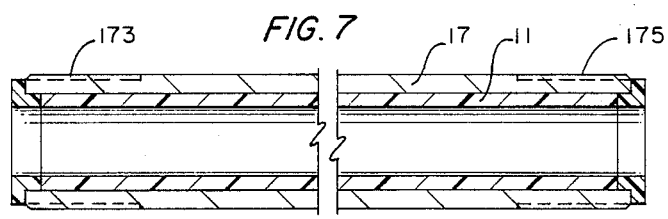
FIG. 7 is similar to FIG. 6, showing the liner having returned to its original outside dimensions to line the tubular member.

FIG. 6 is a side, cross-sectional view of a length of liner 11 which has been downsized and fed into the internal diameter of a tubular member 17 to be lined. A slight clearance 163 exists between the liner 11 and the internal diameter of the tubular member 17. The liner 11 extends slightly beyond each end of the tubular member 17 in the downsized condition and has an end cap 165, 167 butt-welded thereon. The liner 11 is then allowed to expand to substantially its original outside diameter to bond the liner within the tubular member 17. The reverse expansion process causes the end caps 165, 167 to be drawn snugly up against the ends 169, 171 of the tubular member 17. The tubular member 17 shown in FIG. 7 is a length of oil field pipe having externally threaded ends 173, 175.

The operation of the apparatus and method of the invention should be apparent from the foregoing discussion. A tubular member 17 is lined with an elastomeric liner 11 which has an outside diameter which is initially greater than the inside diameter of the tubular member. The liner is reduced to a downsized outside diameter by simultaneously rolling and crushing the liner a preselected amount using downsizing rollers 21 and a hydraulic press 57, whereby the liner retains a standard dimensional ratio in the downsized condition. The liner 11 is then inserted into the tubular member 17 and allowed to expand to substantially its original outside diameter to thereby bond the liner within the tubular member.

As an example of the present method, a steel pipe having an inside diameter of 2.062 inches was lined according to the method of the invention. The liner was a polyethylene pipe having an initial outside diameter of 2.30 inches with a wall thickness of 0.07 inches. The percentage reduction in outside diameter of the liner is shown in Table I as it passed through each stage of the method.

TABLE I

| 2.30 inch polyethylene liner (all dimensions in inches) | | | | | |
|---|---|---|---|---|---|
| roller set 19 | roller set 20 | roller set 22 | gripping station 59 | gripping station 61 | roller set 153 |
| o.d. 2.254 | 2.208 | 2.162 | 2.070 | 2.024 | 0.1955 |
| % reduc- 2% | 4% | 6% | 10% | 12% | 15% |

The reduced liner 11 returned to its approximate original outside dimensions within about one half hour and securely bonded within the interior of the pipe 17.

An invention has been provided with several advantages. Because the reverse expansion characteristics or "memory" of the liner 11 are known, the liner returns to a pre-determined size to fill out and conform to the internal diameter of the tubular member 17 without the use of heat or chemical bonding agents. The simultaneous use of rolling and crushing the liner 11 has been found to maintain the standard dimensional ratio of the liner in a downsized condition so that a more approximate linear elongation of the liner is achieved. Because a nearly perfect linear expansion of the liner results, a more uniform bond can be achieved within the internal diameter of the tubular member as the liner reversely expands. The method does not require the use of heat which could thermally stress the liner and does not require the use of chemical bonding agents.

While the invention has been shown in only one of its forms, it is not thus limited but is susceptible to various changes and modifications without departing from the spirit thereof.

I claim:

1. A method of lining a tubular member with an elastomeric liner having an outside diameter which is initially greater than the inside diameter of the tubular member, the method comprising the steps of:

reducing a length of the liner to a downsized outside diameter by passing the liner through a series of downsizing rollers to initially reduce the outside diameter at a first station and through a hydraulic press at a second station to additionally reduce the liner outside diameter, the liner being rolled and simultaneously crushed a preselected amount as it is gripped and pulled through the first and second stations to thereby effect a linear elongation of the liner, whereby the liner retains a standard dimensional ratio in the downsized condition;

inserting the downsized liner into the tubular member to be lined;

allowing the downsized liner to expand to substantially its original outside diameter whereby the liner makes 360 degree contact with the inner surface of the tubular member and exerts radial pressure on the tubular member to hold the liner firmly in position.

2. The method of claim 1, wherein the synthetic elastomer selected for use as the liner has a known reverse expansion characteristics and wherein the degree of elongation which is effected is calculated to allow insertion of the liner within the tubular member, reverse expansion of the liner serving to tightly engage the liner within the internal diameter of the tubular member.

3. The method of claim 2, wherein the synthetic elastomer selected is a polyolefin.

4. The method of claim 3, wherein the polyolefin is polyethylene.

5. The method of claim 4, wherein the liner prior to being rolled and crushed has an initial outside diameter about 10 to 15% greater than the inside diameter of the tubular member.

6. A method of lining a tubular member having an inner surface with an elastomeric liner having an outside diameter which is initially greater than the inside diameter of the tubular member, the method comprising the steps of:

first feeding the liner through a series of hemispherical downsizing rollers the hemispherical downsizing rollers being provided in sets, each set being made up of three rollers which are offset at 120 degree increments, each of the rollers having an axis of rotation which intersects at the midpoint of a linear receiving opening and which defines a 360 degree region of contact with the linear being fed through the liner receiving opening;

next, feeding the liner to a hydraulic press having first and second hydraulic crushing stations including first and second travelling carriage, each travelling carriage being provided with a crushing die for alternately crushing and releasing the linear, the carriage being track mounted on a base for movement in a generally horizontal plane, and wherein each crushing die includes an upper and lower longitudinally extending plate, each plate having a semi-spherical profile for grasping and further reducing the liner;

rolling and simultaneously crushing a length of the liner to a preselected downsized outside diameter by actuating the crushing stations to engage the liner in staggered fashion, the liner being pulled through the downsizing rollers to initially reduce the outside diameter of the liner and simultaneously crushed at the crushing stations to additionally reduce the liner outside diameter and to thereby effect a linear elongation of the liner, whereby the liner retains a standard dimensional ratio in the downsized condition;

inserting the downsized liner into the tubular member to be lined;

allowing the downsized liner to expand to substantially its original outside diameter, whereby the liner bears tightly against the makes 360 degree with the inner surface of the tubular member.

7. The method of claim 6, wherein each travelling carriage is provided with an engagement dog for engaging a drive chain, the drive chain being driven by a motor through a gearbox for moving the travelling carriages along the track.

* * * * *